(12) United States Patent
Ng

(10) Patent No.: US 9,955,757 B1
(45) Date of Patent: May 1, 2018

(54) MAGNET BUCKLE

(71) Applicant: SAMUEL SAMUEL LIMITED, Hong Kong (HK)

(72) Inventor: Tak Sum Ng, HongKong (HK)

(73) Assignee: SAMUEL SAMUEL LIMITED, Hong Kong (HK)

( * ) Notice: Subject to any disclaimer, the term of this patent is extended or adjusted under 35 U.S.C. 154(b) by 0 days. days.

(21) Appl. No.: 15/625,661

(22) Filed: Jun. 16, 2017

(30) Foreign Application Priority Data

Jun. 8, 2017 (HK) .................... 17105688.7

(51) Int. Cl.
*A44B 17/00* (2006.01)
*F16B 1/00* (2006.01)
*A43C 19/00* (2006.01)
*A41F 1/00* (2006.01)

(52) U.S. Cl.
CPC .......... *A44B 17/0082* (2013.01); *A41F 1/002* (2013.01); *A43C 19/00* (2013.01); *A44B 17/0011* (2013.01); *F16B 1/00* (2013.01); *A44D 2203/00* (2013.01); *F16B 2001/0035* (2013.01)

(58) Field of Classification Search
CPC . Y10T 24/32; A44B 17/0082; A44B 17/0011; F16B 1/00; F16B 2001/0035; A43C 19/00; A41F 1/002; A44D 2203/00
See application file for complete search history.

(56) References Cited

U.S. PATENT DOCUMENTS

| | | | | |
|---|---|---|---|---|
| 2010/0308605 | A1* | 12/2010 | Fiedler ............... | A45C 13/1069 292/251.5 |
| 2011/0298227 | A1* | 12/2011 | Fiedler ............... | A45C 13/1069 292/251.5 |
| 2012/0124786 | A1* | 5/2012 | Fiedler ............... | A45C 13/1069 24/303 |
| 2012/0248793 | A1* | 10/2012 | Fiedler ................ | A44B 11/258 292/163 |
| 2012/0291227 | A1* | 11/2012 | Fiedler .................... | A42B 3/04 24/3.3 |
| 2014/0339232 | A1* | 11/2014 | Fiedler ............... | A45C 13/1069 220/348 |
| 2017/0114571 | A1* | 4/2017 | Fiedler ................... | E05B 65/52 |

\* cited by examiner

*Primary Examiner* — Robert Sandy
*Assistant Examiner* — Michael S Lee
(74) *Attorney, Agent, or Firm* — Wayne & King LLC

(57) ABSTRACT

A magnet buckle includes: a first part and a second part, the first part includes a shell, a first magnet and a stop mechanism; the shell is provided with a groove, the first magnet is disposed inside the groove, the second part includes a main body and a second magnet, the second magnet is disposed inside the main body, the first part and the second part can be fixed with each other through magnetic attraction between the first magnet and the second magnet, such that the main body can be accommodated in the groove and fixed by the stop mechanism; the groove is provided with a top opening configured to allow the main body to be inserted inward, and a side opening through which the main body can be detached from the first part.

11 Claims, 10 Drawing Sheets

MAGNET BUCKLE

CROSS-REFERENCE TO RELATED APPLICATIONS

This application claims priority to Hong Kong Patent Application No. 17105688.7 with a filing date of Jun. 8, 2017. The content of the aforementioned applications, including any intervening amendments thereto, are incorporated herein by reference.

TECHNICAL FIELD

The present disclosure relates to a magnet connection structure, specially relates to a magnet buckle.

BACKGROUND OF THE PRESENT INVENTION

Decorations on the clothes, shoes or bags can greatly improve the artistry. Generally, different clothes or shoes have different decorations, and a cloth or a pair of shoes have one kind of decoration. If one person wants to change the decoration for the cloth or the shoes, he can only buy a new one because the decorations of the cloth or the shoes are unchangeable. Existing technology discloses a buckle structure fixed to clothes or shoes, by which the decorations of the clothes or shoes can be changed. However, this kind of buckles is unable to fix decorations firmly which may cause the decorations to rotate. Furthermore, this mechanical buckle may not be detached easily, which may further damage the surface of clothes and shoes.

SUMMARY OF PRESENT INVENTION

In order to solve the problems in the existing technology, the present disclosure provides a magnet buckle, comprising: a first part and a second part; wherein the first part comprises a shell, a first magnet and a stop mechanism, the shell is provided with a groove, the first magnet is disposed inside the groove, the second part comprises a main body and a second magnet, the second magnet is disposed inside the main body, wherein the first part and the second part can be fixed with each other through magnetic attraction between the first magnet and the second magnet, such that the main body can be accommodated in the groove and fixed by the stop mechanism; wherein: the groove is configured to accommodate the second part when the second part is fixed with the first part; the groove is provided with a top opening configured to allow the main body to be inserted inward, and a side opening through which the main body can be detached from the first part.

With respect to the magnet buckle in the present disclosure, the stop mechanism is mounted on the inner walls of the groove; the stop mechanism is configured to allow the second part to be inserted into the groove through the top opening and stop the second part being pulled out through the top opening.

With respect to the magnet buckle in the present disclosure, the second part is provided with a raised line around the main body, the raised line includes an inclined surface and a flat surface.

With respect to the magnet buckle in the present disclosure, when the main body is inserted into the groove by the magnetic attraction force, the inclined surface presses and deforms the stop mechanism, such that the second part is allowed to be inserted into the groove; after the second part is accommodated in the groove, the stop mechanism resiles and abuts the flat surface, so as to stop the second part being taken out through the top opening.

With respect to the magnet buckle in the present disclosure, the stop mechanism is a snap ring.

With respect to the magnet buckle in the present disclosure, the first part further comprises a spring arranged between the first magnet and the shell, which is configured to push the first magnet fixed with the main body toward the top opening so as to make the flat surface to abut the stop mechanism tightly.

With respect to the magnet buckle in the present disclosure, the first part is fixed with a decoration by gluing, the second part is fixed with a shoe by riveting.

With respect to the magnet buckle in the present disclosure, the main body is further provided with a plurality of projections configured to improve the stability of the connection between the second part and the shoe.

The present disclosure further discloses a method for using the magnet buckle, comprising following steps:
fixing a first part with a decoration and fixing a second part with an article;
inserting the second part into a groove of the first part through a top opening of the first part by magnet attraction.

The present disclosure further discloses another method for using the magnet buckle, comprising following steps:
fixing a first part with a decoration and fixing a second part with an article;
inserting the second part into a groove of the first part through a top opening of the first part by magnet attraction;
sliding the second part from the groove toward a side opening of the first part and taking the second part from the first part;
changing another first part fixed with another decoration and inserting the second part into a groove of the another first part.

DETAILED DESCRIPTION OF PREFERRED EMBODIMENTS

Figure 1:
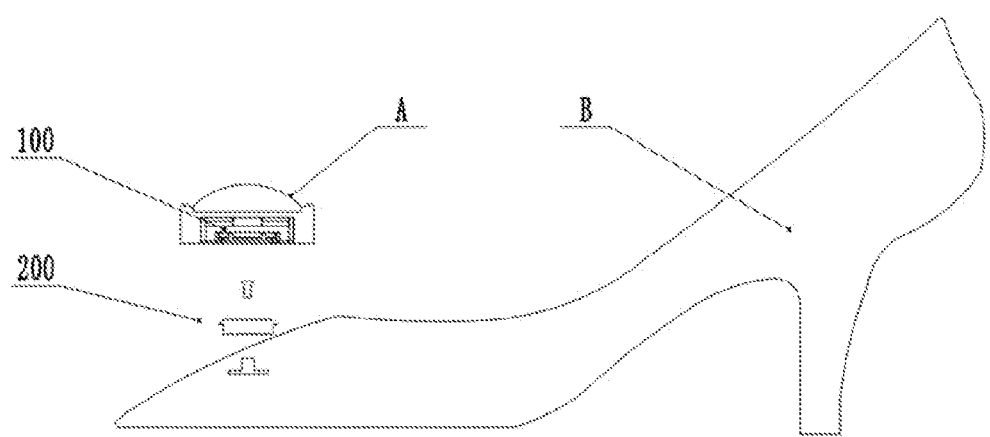
FIG. 1 is a using schematic diagram of one embodiment in the present disclosure.
Figure 2A:
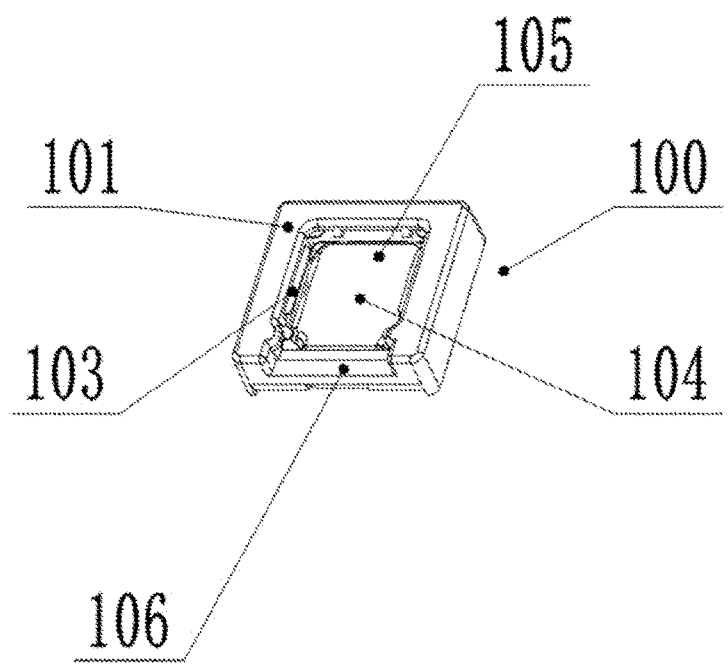
FIG. 2a is a stereogram of a first part of one embodiment in the present disclosure.
Figure 2B:
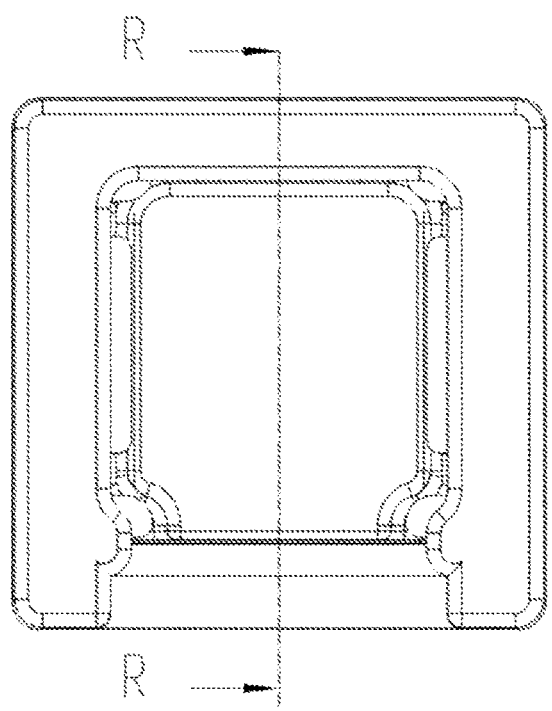
FIG. 2b is a top view of the first part in the FIG. 2a, and FIG. 2c is a section view along the R-R line in the FIG. 2b.
Figure 2C:
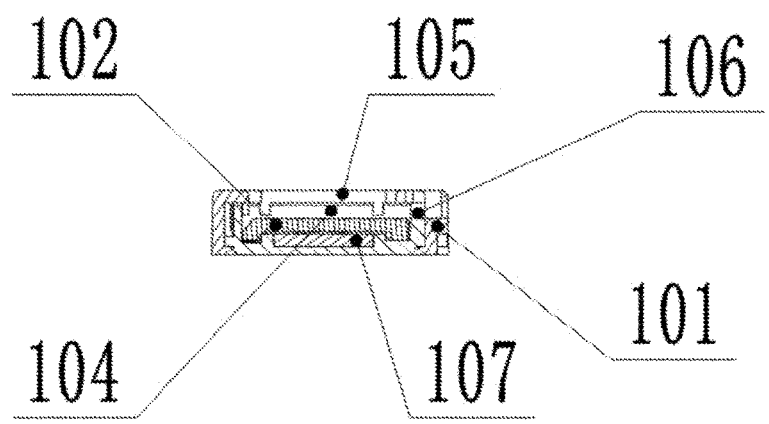
Figure 3A:
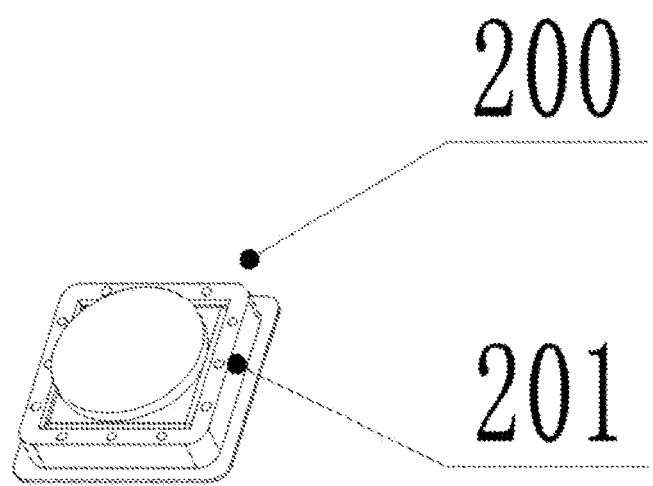
FIG. 3a is a stereogram of a second part of one embodiment in the present disclosure.
Figure 3B:
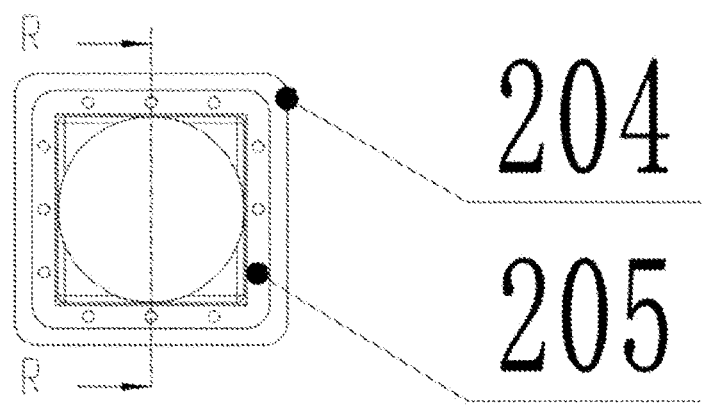
FIG. 3b is a top view of the second part in the FIG. 3a, and FIG. 3c is a section view along the R-R line in the FIG. 3b.
Figure 3C:
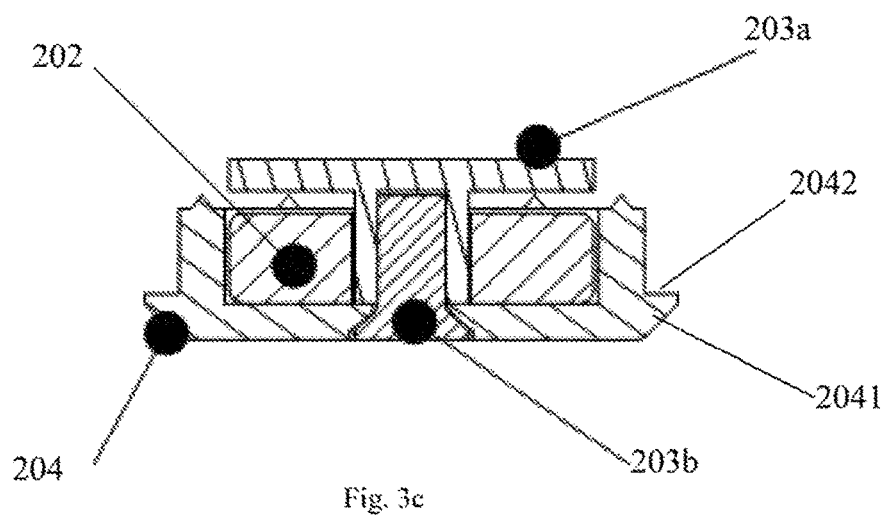
Figure 4A:
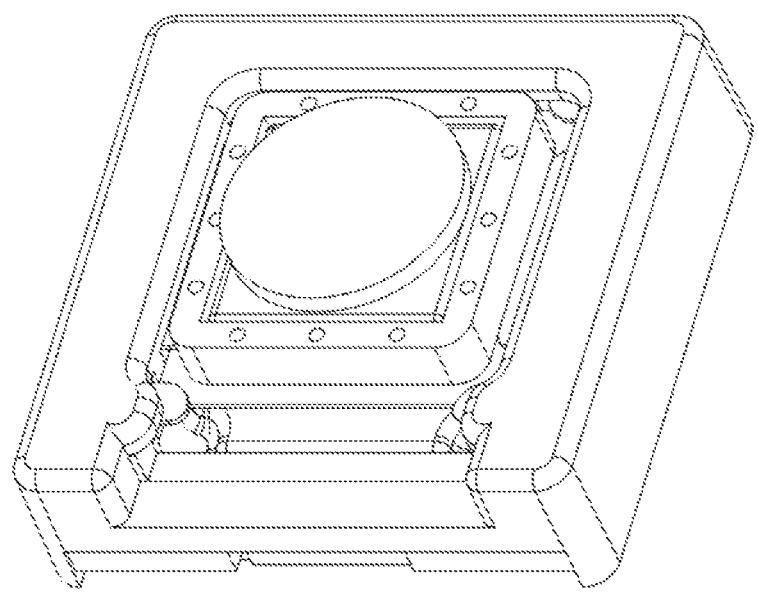
FIG. 4a is a stereogram of the first part being fixed with the second part in one embodiment in the present disclosure.
Figure 4B:
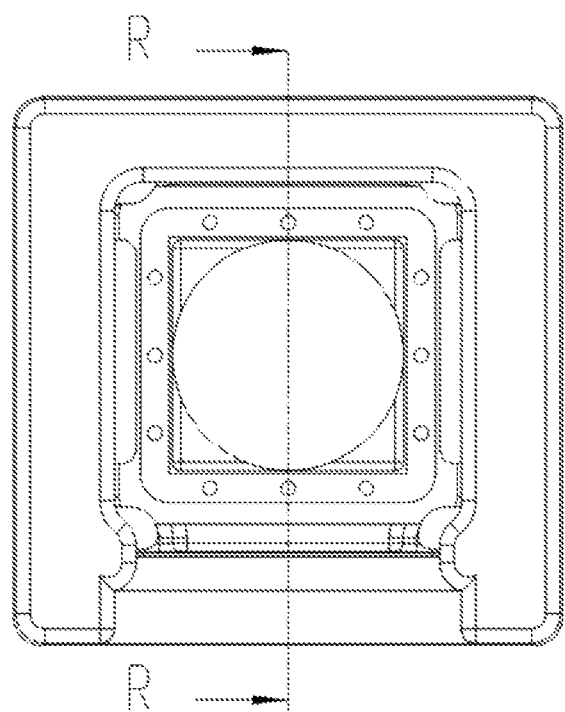
FIG. 4b is a top view of the first part being fixed with the second part in the FIG. 4a, and FIG. 4c is a section view along the R-R line in the FIG. 4b.
Figure 4C:
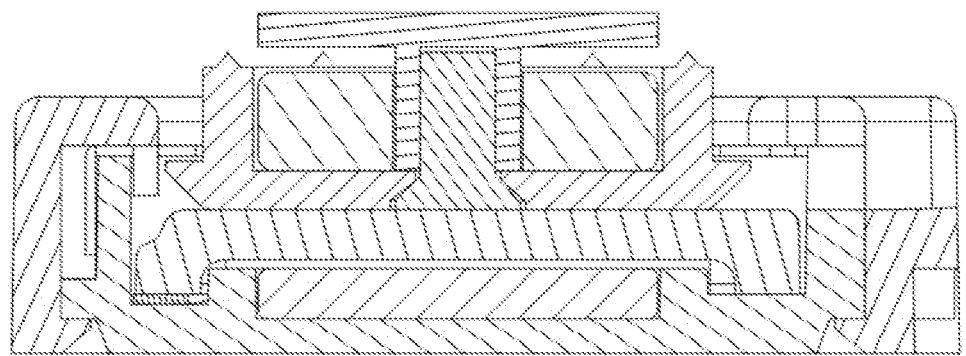

In order to describe the technical solution, objectives and technical effects of the present disclosure more clearly, the below will describe companying with embodiments and figures. To be understood that, the embodiments described below are only used to explain, rather than limit this invention.

Referring to FIGS. 1-4, the present disclosure provides a magnet buckle, which comprises a first part 100 and a second part 200. The first part 100 and the second part 200 can be fixed with each other through magnetic attraction. The first part 100 is fixed with one kind of decoration A. The second part 200 is fixed to articles B like clothes, shoes or other articles of daily use. The articles can connect with different decorations by changing different first parts 100 and connecting to the second part 200. In one embodiment of the disclosure, the first part 100 is fixed with decoration by gluing. In one embodiment of the disclosure, the second part 200 is fixed with the articles by riveting. In another embodiment of the disclosure, the first part 100 is fixed with articles and the second part 100 is fixed with the decoration.

The first part 100 comprises a shell 101, a first magnet 102 and a stop mechanism 103. In one embodiment, the shell 101 is made in a square shape. The shell 101 is provided with a square groove 104. The first magnet 102 is disposed inside the groove 104.

The groove 104 is configured to accommodate the second part 200 when the second part 200 is fixed with the first part 100. The groove 104 includes a top opening 105 configured to allow the second part 200 to be inserted inward, and a side opening 106 through which the second part 200 can be detached from the first part 100.

The stop mechanism 103 is mounted on the inner walls of the groove 104. The stop mechanism 103 is configured to allow the second part 200 to be inserted into the groove 104 through the top opening 105 and stop the second part 200 being pulled out through the top opening 105. In one embodiment of the disclosure, the stop mechanism 103 is a snap spring. The snap spring can allow the second part 200 to be inserted into the groove 104 by elastic deformation and stop the second part 200 to be pulled out from the groove 104 after resiling.

The second part 200 is fixed to articles like clothes or shoes by rivet components 203a, 203b. In FIG. 1, the second part 200 is fixed to a shoe. The second part 200 comprises a main body 201, a second magnet 202 and rivet components 203a, 203b.

The main body 201 is made in a square shape corresponding to the groove 104, such that the main body 201 can be accommodated in the groove 104 without being rotated with respect to the first part 100. The second magnet 202 is disposed inside the main body 201.

The main body 201 is provided with a raised line 204 around the main body 201. The raised line 204 includes an inclined surface 2041 and a flat surface 2042. When the second part 200 is inserted into the groove 104 by the magnetic attraction force, the inclined surface 2041 presses and deforms the stop mechanism 103, such that the second part 200 is allowed to be inserted into the groove 104. After the second part 200 is inserted into the groove 104 through the magnetic attraction force, the stop mechanism 103 abuts the flat surface 2042 after the stop mechanism 103 resiles, so as to stop the second part 200 being taken out through the top opening 105.

In one embodiment of the present disclosure, the first part 100 further comprises a spring 107 arranged between the first magnet 102 and the shell 101, which is configured to push the first magnet 102 which is fixed with the second part 200 toward the top opening so as to make the flat surface 2042 to abut the stop mechanism 103 tightly.

In one embodiment of the present disclosure, the main body 201 is further provided with a plurality of projections 205 which are configured to improve the stability of the connection between the second part 200 and the articles.

The present disclosure further provides a method for using the magnet buckle, which comprises following steps:

fixing the first part 100 with a decoration and fixing the second part 200 with an article;

inserting the second part 200 into the groove 104 of the first part 100 through the top opening 105 by magnet attraction.

In one embodiment, the first part 100 is fixed with the decoration A through gluing. In one embodiment, the second part 200 is fixed with the article B through riveting.

The present disclosure provides another method for using the magnet buckle, which comprises following steps:

fixing the first part 100 with a decoration and fixing the second part 200 with an article;

inserting the second part 200 into the groove 104 of the first part 100 through the top opening 105 by magnet attraction;

sliding the second part 200 from the groove 104 toward the side opening 106 and taking the second part 200 from the first part 100;

changing another first part 100 fixed with another decoration and inserting the second part 200 into the groove 104 of the another first part 100.

The technical effects of this present disclosure are as below: On one hand, the first part and the second part can connect with each other easily and firmly. On the other hand, the second part can detached from the first part easily too. Furthermore, through the magnet buckle of the invention, one article like clothes or shoes can change with different decorations.

To the skilled in the field, this invention is apparently not limited to the details in the above embodiments, and this invention can be embodied in other specific forms without departing from the spirit and the base characterize of the invention. Therefore, the embodiments should be seen as samples, rather than to limit the invention. The scope of the invention is defined by the claims as attached rather than the above description, therefore, any equivalent or transformation within the scope of the claims is included in the invention. The reference numbers in the claims should not be seen to limit the claims.

It is to be understood that, though the Description is described according to the embodiments, each embodiment may include more than one independent technical solution. This describing manner is only to clarify, the skilled in the field should consider the specification as an entirety. The technical solutions in each embodiment can also be combined properly to obtain other embodiments which can be understood by the skilled in the field.

I claim:
1. A magnet buckle, comprising:
a first part and a second part;
wherein the first part comprises a shell, a first magnet and a stop mechanism, the shell is provided with a groove, the first magnet is disposed inside the groove, the second part comprises a main body and a second magnet, the second magnet is disposed inside the main body,
wherein the first part and the second part can be fixed with each other through magnetic attraction between the first magnet and the second magnet, such that the main body can be accommodated in the groove and fixed by the stop mechanism;
wherein:
the groove is configured to accommodate the second part when the second part is fixed with the first part;

the groove is provided with a top opening configured to allow the main body to be inserted inward, and a side opening through which the main body can be detached from the first part;

the first part further comprises a spring arranged between the first magnet and the shell, which is configured to push the first magnet fixed with the main body toward the too opening so as to make the main body to abut the stop mechanism tightly.

2. The magnet buckle of claim 1, wherein the stop mechanism is mounted on the inner walls of the groove; the stop mechanism is configured to allow the second part to be inserted into the groove through the top opening and stop the second part being pulled out through the top opening.

3. The magnet buckle of claim 2, wherein the second part is provided with a raised line around the main body, the raised line includes an inclined surface and a flat surface.

4. The magnet buckle of claim 3, wherein:

when the main body is inserted into the groove by the magnetic attraction force, the inclined surface presses and deforms the stop mechanism, such that the second part is allowed to be inserted into the groove;

after the second part is accommodated in the groove, the stop mechanism resiles and abuts the flat surface, so as to stop the second part being taken out through the top opening.

5. The magnet buckle of claim 4, wherein the stop mechanism is a snap spring.

6. The magnet buckle of claim 5, wherein the first part is fixed with a decoration by gluing, and the second part is fixed with a shoe by riveting.

7. The magnet buckle of claim 1, wherein the main body is further provided with a plurality of projections configured to improve the stability of the connection between the second part and the shoe.

8. A method for using the magnet buckle of claim 1, comprising following steps:

fixing a first part with a decoration and fixing a second part with an article;

inserting the second part into a groove of the first part through a top opening of the first part by magnet attraction.

9. A method for using the magnet buckle of claim 1, comprising following steps:

fixing a first part with a decoration and fixing a second part with an article;

inserting the second part into a groove of the first part through a top opening of the first part by magnet attraction;

sliding the second part from the groove toward a side opening of the first part and taking the second part from the first part;

changing another first part fixed with another decoration and inserting the second part into a groove of the another first part.

10. The magnet buckle of claim 1, wherein the shell is made in a square shape, the groove is made in a square shape, and the main body is made in a square shape corresponding to the groove.

11. The magnet buckle of claim 6, wherein the first part is embedded into the decoration.

* * * * *